April 4, 1961  S. A. ZARLENG ET AL  2,978,632
CONTROL SYSTEM WITH ONE TRANSISTOR
Filed Sept. 2, 1958  2 Sheets-Sheet 1

INVENTORS
Steve A. Zarleng
and
BY Benjamin H. Carlisle

Harry R. Canfield
Attorney

April 4, 1961 S. A. ZARLENG ET AL 2,978,632
CONTROL SYSTEM WITH ONE TRANSISTOR
Filed Sept. 2, 1958 2 Sheets-Sheet 2

INVENTORS
Steve A. Zarleng
and
BY Benjamin H. Carlisle
Harry P. Canfield
Attorney États-Unis Patent Office 2,978,632
Patented Apr. 4, 1961

2,978,632

CONTROL SYSTEM WITH ONE TRANSISTOR

Steve A. Zarleng, Akron, and Benjamin H. Carlisle, Cleveland, Ohio, assignors to The Clark Controller Company, Cleveland, Ohio, a corporation of Ohio Filed Sept. 2, 1958, Ser. No. 758,479

15 Claims. (Cl. 323—89)

The invention hereof relates to electric control systems for controlling the operations of cyclically operating mechanisms or machines.

Typical of such machines are motor-operated presses; and since the invention has particular advantages when applied to presses, it will be described herein in that use, as an example; and then those skilled in the art will know, from that description, how to apply it to other machines.

In the fully developed press, there is a stationary base supporting a lower die; and a head carrying an upper die, reciprocable toward and from the lower die; to operate on work placed between the dies.

The head is reciprocated by a crankshaft and the crankshaft is driven by a continuously running motor.

The crankshaft is connected to and disconnected from the motor by an air operated brake and clutch device.

When air is admitted to the brake and clutch device, the brake releases the crankshaft and the clutch causes it to become engaged with the motor, and it rotates.

When air is exhausted from the brake and clutch device, the clutch disengages the crankshaft from the motor and the brake engages the crankshaft to bring it to a rapid stop.

It is therefore seen, that the operation of a press is controlled by controlling the admission of air to and the exhausting of air from the brake and clutch device. The normal practice is to use an electromagnetically operated 3-way valve device to control the air to the brake and clutch device.

The valve device is connected so that when the winding of the electromagnetic operator is energized, air flows to the brake and clutch device and the press operates. When the winding of the electromagnetic operator is de-energized, air is exhausted from the brake and clutch device and the brake sets to stop and prevent any further operation of the press.

Thus, it is obvious that the press can be operably controlled by a suitable electrical circuit.

The circuit of the present invention has many economic and operational features and advantages as will become apparent hereinafter. It is connected to energize and de-energize the winding of the electromagnetic operator, at times and in a manner for maximum safety to the operator, to the press, and to the work; the principal features being as follows.

A saturable transformer has a secondary circuit permanently connected to the emitter-base current path of a normally non-conducting transistor; and the transformer has two primaries both energized by unidirectional current and one of them opposing the other and normally predominating over it and saturating the transformer core with flux in, say the negative direction.

The predominating primary has in series therewith a pair or plurality of pairs of operator's switches, preferably of the push button type. When any one of them is operated, the predominating primary is thereby de-energized, and the said other primary reverses the flux in the core, saturating it in the positive direction, and the reversing flux induces a pulse of current in the secondary. This pulse energizes the emitter-base current path of the transistor and renders the main current path of the transistor conducting.

Rectified main current then flows from the A.C. source through the transistor and through a control winding on a first magnetic amplifier and saturates its core.

The transistor tends to become non-conducting at the end of the said current pulse, but is maintained conducting by feedback current derived from the main current, and flowing through the emitter-base path of the transistor.

The said first magnetic amplifier has main windings in a main circuit containing also the aforesaid winding of the electromagnetic operator, and a control winding of a second magnetic amplifier.

When all of the operator's switches have been operated, current flows from the A.C. source through the operator's switches and through the said main circuit, to saturate the core of the first amplifier and energize the winding of the electromagnetic operator, which starts a cycle of the machine.

The second amplifier has main windings in a main circuit containing also the winding of the electromagnetic operator and the control winding of the second amplifier.

At the end of a first timed interval following energization of the winding of the electromagnetic operator and starting a cycle by the first amplifier, cam switches, operated by the rotation of the crankshaft, close. Current from the A.C. source flows through the closed cam switches to the main circuit of the second amplifier and is rectified and flows through the winding of the electromagnetic operator and control winding of the second amplifier.

The operator's switches may now be released, and restored to their normal positions. This cuts off the first amplifier from the A.C. source leaving the winding of the electromagnetic operator energized by the second amplifier alone, and energizes the predominating winding of the saturable transformer causing it to induce a pulse of current in the secondary and in the emitter-base current path of the transistor in the direction to render the transistor non-conducting, and current flow through the transistor stops.

At the end of a complete cycle of the machine, the cam switches restore, cutting off the second amplifier from the source, and de-energizing the winding of the electromagnetic operator, which stops the machine.

The entire system is thus restored to its initial condition after one complete cycle of operation.

The current that flows through the transistor and through the saturating control winding of the first amplifier comes from the A.C. source through other cam switches that open and then close again near the end of the cycle.

Therefore, if any one of the operator's switches had not been released or did not restore, the transistor would have remained conducting. This is protected against by the momentary opening of the said other cam switches which interrupts the flow of current through the transistor and therefore interrupts the feedback current that maintains the transistor conducting; and it becomes non-conducting; and energization of the saturating control winding of the first amplifier ceases.

As a consequence, if it be attempted to start another cycles of operations, by operating those operator switches that had been restored, the first amplifier would thereby be connected to the A.C. source; but because its saturating control winding would not be energized, its output going to the winding of the electromagnetic operator would be zero or negligibly small, and the winding of the electromagnetic operator would not become energized to start a new cycle.

Thus for safety it is made necessary for all of the operator's switches to be restored sometime after the end of the first timed interval and be maintained restored until the other cam switches have opened and closed, before another cycle can be initiated.

The circuitry of the control is adapted to "running" characteristics; starting upon operation of the push button switches and running one complete cycle, or revolution of the press crankshaft, and then stopping, as was described: or to have "Inching" characteristics; starting and running upon operation of the push button switches for any fraction of a cycle in any part of the cycle, and stopping upon restoring the push button switches at will: or to have "Continuous" characteristics; starting upon operation of the push button switches and then continuing to run cycle after cycle indefinitely, until stopped by cutting off the source of current to the system.

These characteristics of operation are selectable by a corresponding setting of a selector switch.

It is among the objects of the invention:

To provide a control for a cyclically operating machine having among others the features referred to in the foregoing description.

Other objects will occur to those skilled in the art after a reading of a complete description of an embodiment of the invention to follow.

An embodiment of the invention is fully disclosed in the following description taken in connection with the accompanying drawing in which.

Figure 1:
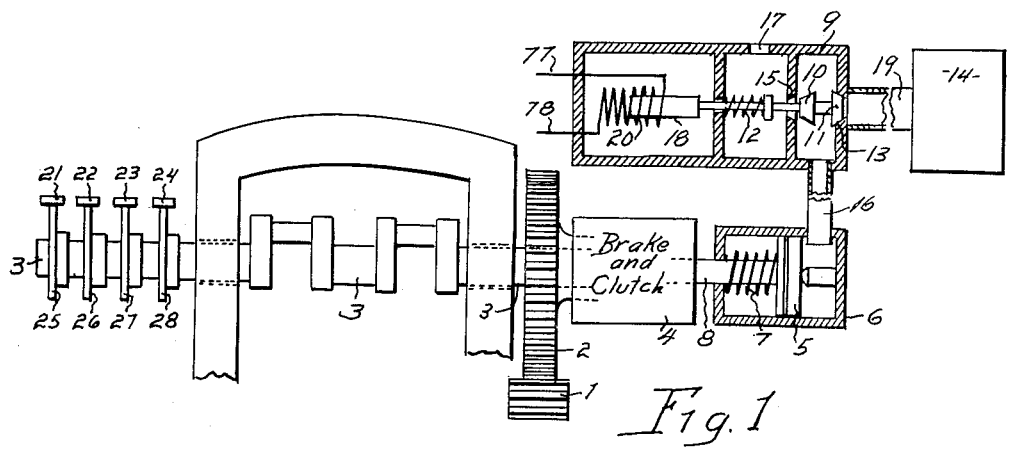
Fig. 1 is a somewhat diagrammatic view of a part of a press, showing the known means for starting and stopping its operation by energization and de-energization of a winding.

In Fig. 1, a motor pinion 1 continuously drives a large gear 2 rotatably on a crankshaft 3. The crankshaft and a hub of the gear extends into a brake and clutch device 4. A piston 5 in an air cylinder 6 is moved toward the right by a spring 7 and exhausts the air from behind the piston 5. A piston rod 8 connected to piston 5 operates the device 4 to set a brake, which brakes rotation of the crankshaft 3; and also to release a clutch, which disconnects the gear 2 from the crankshaft 3.

Air under pressure is admitted to the cylinder 6 behind the piston 5 and causes it to be moved against the force of spring 7. Piston 8 is moved to operate the device 4 so the brake is released and the clutch is set, connecting the gear 2 to the crankshaft 3. Thus, crankshaft 3 is connected to be driven rotatably by the motor.

A valve device 9 has valves 10 and 11 reciprocable in unison toward the right by a spring 12. Valve 11 closes a port 13 to shut off the air under pressure from supply 14. Valve 10 opens a port 15 to exhaust the air from cylinder 6 by way of a pipe 16, valve port 15, and exhaust outlet 17.

The valves 10 and 11 are reciprocable toward the left by an electromagnetic operator 18, when its winding 20 is energized. Valve 10 closes exhaust port 15 and valve 11 opens port 13 to admit air under pressure from the supply 14 to the cylinder 6 by way of a pipe 19, port 13, and pipe 16.

In Fig. 1 is also shown a group of four switches 21, 22, 23 and 24 that are operated by cams 25, 26, 27 and 28 respectively. The cams are mounted on the press crankshaft to operate the switches at predetermined points in a revolution or cycle thereof and as will be referred to hereinafter.

As will now be seen, the operation of the press is controlled by the winding 20. Energization of the winding 20 causes the brake to be released and the clutch to be set so the crankshaft 3 will be driven by the motor. Deenergization of the winding 20 causes the clutch to be released and the brake to be set to stop rotation of the crankshaft 3.

Figure 2:
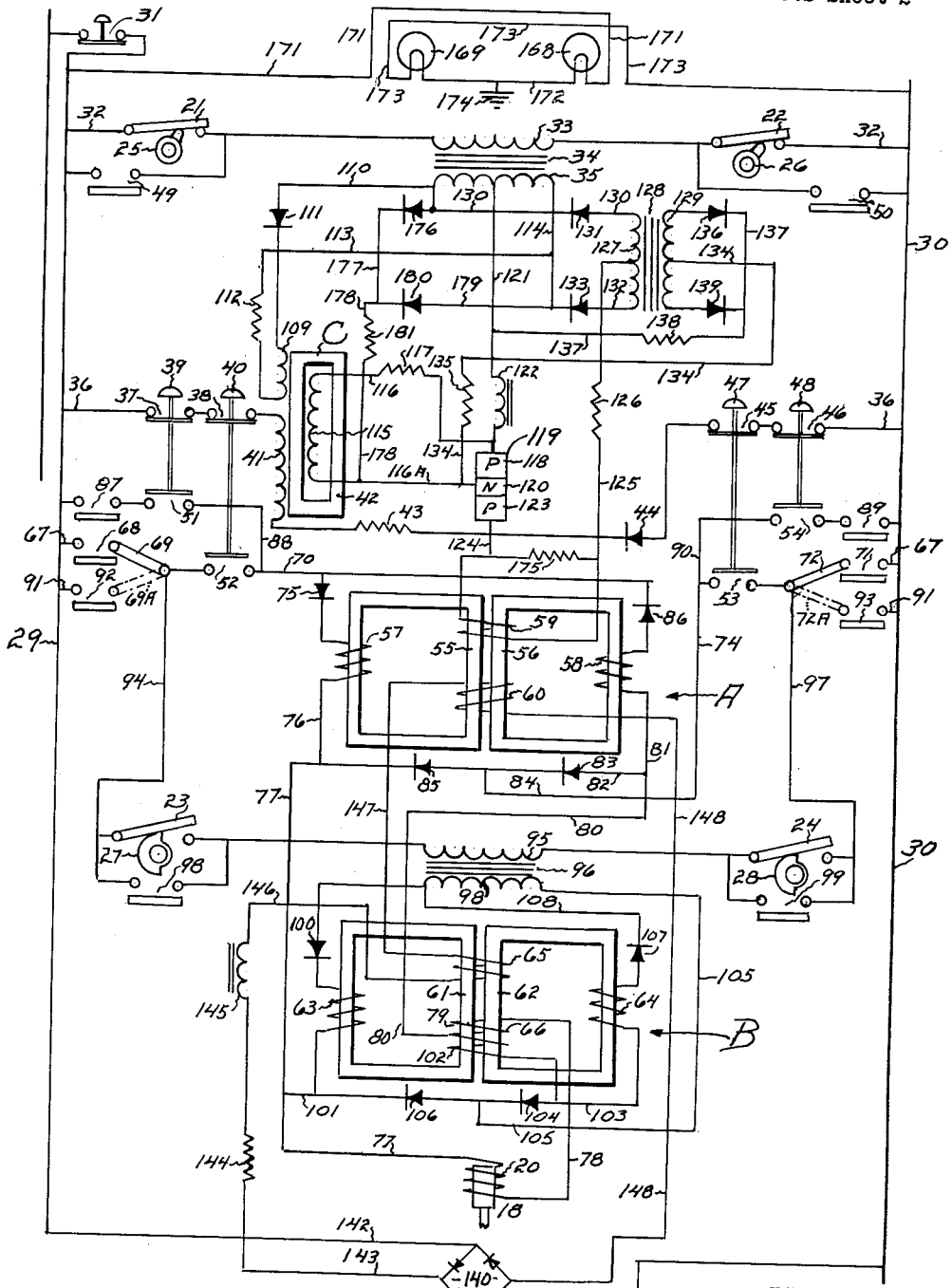
Fig. 2 is a diagrammatic view of the circuitry for energizing and de-energizing the said winding, and embodying the principal part of the invention.

In Fig. 2 at 29 and 30 are alternating current supply mains, the main 30 being connected to a source not shown, the main 29 being connected to the source through a disconnecting switch 31.

A cross line 32—32 between the means 29—30 contains normally closed cam switches 21 and 22, and the primary 33 of a transformer 34 having a secondary 35. The switches 21 and 22 are operable by cams 25 and 26, mounted on the press crankshaft, see Fig. 1.

A cross line 36—36, between mains 29 and 30 contains normally closed contacts 37 and 38 of push button switches 39 and 40; the primary 41 of a transformer C having a saturable core 42; a resistor 43; a rectifier 44; and normally closed contacts 45 and 46 of push button switches 47 and 48.

The push button switches 39 and 40 have normally open contacts 51 and 52; and the push button switches 47 and 48 have normally open contacts 53 and 54.

At 55 and 56 are the cores of a rectifying magnetic amplifier unit A, having a main winding 57 on the core 55; a main winding 58 on the core 56; a control winding 59 and a biasing winding 60 on both cores 55 and 56.

At 61 and 62 are the cores of a rectifying magnetic amplifier unit B having a main winding 63 on the core 61; a main winding 64 on the core 62; a biasing winding 65 and a control winding 66 on both cores.

The units A and B may be considered as jointly constituting a rectifying magnetic amplifier means.

At 20 near the bottom of Fig. 2, is the aforesaid winding of the air valves electromagentic operator for effecting starting and stopping of the press upon energization and de-energization thereof.

At 67—67 is a cross line which adjacent to the main 29 contains normally open selector switch contacts 68; a circuit shifting switch element 69; the open push button switch contacts 52; and a wire 70; and this cross line 67 adjacent the main 30 contains open selector switch contacts 71; a circuit shifting switch element 72; the open push button contacts 53; and a wire 74.

This cross line 67 in the part between the wires 70 and 74 comprises the following circuitry in which half waves of A.C. from main 29 to main 30 will flow as follows, when push button contacts 52 and 53, and selector switch contacts 68 and 71, are closed.

From the wires 70; through a rectifier 75; the main winding 57 of amplifier unit A; wires 76 and 77; the winding 20; wire 78; the upper half 79 of winding 66 of amplifier unit B; wires 80, 82; rectifier 83; wire 84; to wire 74.

And this cross line 67, in the part between the wire 74 and 70 also compises the following circuitry in which, when push button contacts 53 and 52 and selector switch contacts 71, 68 are closed, half waves of A.C. will flow in the other direction from main 30 to main 29, as follows.

From wire 74 through wire 84; rectifier 85; wire 77; winding 20; wire 78; upper half 79 of control winding 66; wires 80 and 81; main winding 58; rectifier 86; to wire 70.

The contacts 52 of push button switch 40 are bridged by normally open selector switch contacts 87, contacts 51 of push button switch 39 and wire 88; and the contacts 53 of push button switch 47, are similarly bridged by selector switch contacts 89, contacts 54 of push button switch 48, and wire 90.

The circuit shifting switch elements 69 and 72 can be shifted from their solid line poistions shown, to dotted line positions 69A and 72A; and then a cross line 91—91, adjacent the main 29 contains selector switch contacts 92, switch element 69A, contacts 52 to wire 70; and this cross line 91, adjacent the main 30 contains selector switch contacts 93, switch element 72A, contact 53 to wire 74; and the cross line 91 contains the aforesaid circuitry between the wires 70 and 74.

Between the switch elements 69 and 72 is another circuit comprising a wire 94; a cam switch 23; the primary 95 of a transformer 96; a cam switch 24; and wire 97.

The cam switches 23 and 24, normally open, are operated by cams 27 and 28 on the crankshaft of the press, see Fig. 1.

The transformer 96 has a secondary 98, in which A.C. current flows in alternate directions. Current toward the left flows from the left end of the secondary 98 through a rectifier 100; main winding 63 of amplifier unit B; wires 101 and 77; winding 20, wire 78 to control winding 66 and through both its upper half 79 and lower half 102; to wire 103; rectifier 104; wire 105; back to the right end of the secondary 98.

Current toward the right of the secondary 98 flows from its right end through wire 105; a rectifier 106; wires 101 and 77; the winding 20; wire 78; through the whole winding 66; wire 103; main winding 64 of the amplifier unit B; rectifier 107; and wire 108; back to the left end of the secondary 98.

The saturable transformer C has, besides the primary 41, another primary 109, opposing the primary 41; and always connected across the transformer secondary 35, by wire 110; a rectifier 111; the primary 109; a resistor 112; and wires 113 and 114.

The transformer C has a secondary 115 always connected at one end by wire 116, through a resistor 117, to emitter 118 of a transistor 119, and connected at its other end by a wire 116A directly to the base 120 of the transistor.

At the transformer 34, the center point of its secondary 35 is connected through wire 121; an inductor 122; to the emitter 118 of the transistor 119.

The collector 123 of the transistor is connected by wire 124 to the control winding 59 of amplifier unit A and thence by wire 125, through a resistor 126 to the center point of the primary 127 of a current transformer 128, having a secondary 129.

The upper half of the primary 127 is connected to the left end of the secondary 35 by wire 130 through a rectifier 131; and the lower half is connected to the right end of the secondary 35 by wire 132, through a rectifier 133, and wire 114.

At the current transformer 128, the center point of the secondary 129 is connected by wire 134 through a resistor 135, and wire 116A to the base 120 of the transistor.

The upper half of the secondary 129 is connected through a rectifier 136 and by wire 137 through a resistor 138 to the wire 121, and therefore to the transistor emitter 118; and the lower half is connected through a rectifier 139 to the wire 137, through resistor 138 to the wire 121 and thence to the emitter 118.

The biasing windings 60 and 65 of the respective amplifier units A and B are always energized in series from a rectifier 140 having input from the A.C. mains 29 and 30 by wires 141—142; and having an output circuit comprising wire 143; a resistor 144; an inductor 145; wire 146; winding 65; wire 147; winding 60; and wire 148 back to the rectifier.

These biasing windings 60 and 65 are poled to oppose the control windings 59 and 66 on the respective cores 55—56 and 61—62 of the units A and B; and when a control winding 59 or 66 of either unit is not energized, the current flow in the main windings 57—58 or 63—64 will be at zero or at a very small negligible value; whereby output from the units A and B is under sole control of the control windings.

Hereinbefore, in connection with Fig. 2 the normal running of the press is referred to, that is, starting from rest, running through one cycle, and then stopping. However, the system of Fig. 2 is also adapted for inching the press, that is starting and running for a fraction of the complete cycle in any part of the cycle while the push buttons are depressed and then stopping; when the push buttons are released. The system is also adapted to cause the press to run continuously cycle after cycle when once started, even after the push buttons are released.

Figure 3:
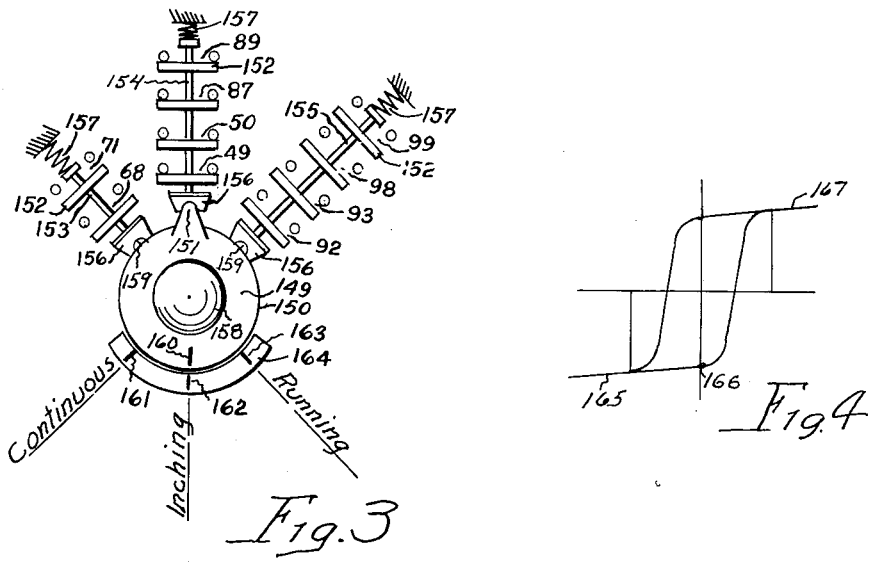
Fig. 3 is a diagrammatic view of a circuit selecting switch, the contacts of which are reproduced in Fig. 2.

These features are provided for in Fig. 2 by the selector switch contacts, 49, 50, 87, 89, 68, 71, 92, 93, 98, 99, and a rotary device for operating them selectively shown in one form, somewhat diagrammatically in Fig. 3.

In Fig. 3 is shown a rotary base 149 having a circular periphery 150 and a camming protuberance 151 thereon.

The contacts are in three radial groups, the groups comprising bars 152 on supports 153, 154, 155 movable with the supports to engage and disengage pairs of stationary contacts, reproduced from Fig. 2.

The supports have cam follower heads 156—156 on their inner ends normally engaged with the periphery 150 of the base by springs 157.

The base 149 may be rotated by a handle 158.

Upon rotating the base by the handle, the protuberance 151 will engage a cam follower head and cammingly move it and its support outwardly to engage the bars with the pairs of stationary contacts; and the protuberance will ultimately enter a notch 159 in the head, indicating that the correct position of the handle has been reached and making that position secure against removal by vibration etc.

As mentioned certain ones of the selector switch contacts are to be closed for "Running," "Inching" and "Continuous" operations, respectively.

The operator may rotate the base 149 until an index mark 160 on the base becomes aligned with one or another of stationary marks 161, 162, 163 on a stationary frame 164 and identified by the legends "Running" "Inching," "Continuous."

In Figs. 2 and 3 contacts 68 and 71 are to be closed and the others open for "Running" operation; contacts 49, 50, 87 and 89 are to be closed and the others open for "Inching" operation; and contacts 92, 93, 98 and 99 are to be closed and the others opened, for "Continuous" operation. Fig. 3 has been illustrated as set for "Inching" operation.

When the press is at rest ready to be operated, it will be at the top of its stroke, the cam switches 21 and 22 will be closed by the cams 25 and 26 on the press crankshaft; the cross line 32—32 will be energized across the A.C. mains 29—30, energizing the transformer primary 33 and its secondary 35.

Assuming that the press is to operate with "Running" characteristics, that is: started, running a whole revolution or cycle, and then stopping, an operator will set the selector switch of Fig. 3 to the "Running" position; which will, in Fig. 2, close contacts 68 and 71; and he will make sure that the circuit changing switch elements 69 and 72 are in solid line position.

The primary winding 109 of the saturable transformer C being connected across the secondary 35 of the transformer 34 through the rectifier 111 will be energized with unidirectional current sufficiently to saturate the core 42 of the transformer in, say, the positive direction; but the cross line 36 will be energized across the mains 29—30 and will energize the primary 41 through the rectifier 44 with unidirectional current sufficient to overpower the primary 109 and saturate the core 42 in the negative direction.

*Running*

To start the press on its cycle, the pair of push buttons 40 and 47 are depressed, opening contacts 38 and 45 and closing contacts 52 and 53.

The opening of contacts 38 and 45 de-energizes primary winding 41 of the saturable transformer C, and the flux in the core 42 is quickly reversed by the primary 109.

This quick reversal of flux generates a pulse of current in the secondary 115.

The transistor 119 has the current path of its emitter 118 and base 120 connected across the secondary 115, by wires 116 and 116A, and the pulse flows in that path and renders the transistor conducting.

The secondary 35 of transformer 34 being energized with alternating current, half waves, say toward the right, will flow from the center point of the secondary down by wire 121 through the conducting transistor 119 to the control winding 59 of amplifier unit A, and back by wire 125 to the center point of the primary 127 of the current transformer 128, and thence through the rectifier 131, to the left end of the secondary 35.

Similarly, half waves toward the left in secondary 35 will flow from the center point of the secondary by wire 121 through the transistor 119 and winding 59 to the primary 127 and down through the lower half thereof and through rectifier 133 to the right end of the secondary 35.

Since the transistor 119 was made conducting by a pulse of current, then in the absence of countervailing provisions it would have become non-conducting when the pulse terminated. Such provisions are provided as follows.

The current transformer 128 has a secondary 129 in which alternating current is generated. Half waves flowing upwardly, go through the upper half thereof and by rectifier 136 to wire 137 and thence to the wire 121. Half waves flowing downwardly in the secondary 129 go through the lower half thereof and through rectifier 139 to wire 137, to wire 121. Both half waves therefore are supplied to the wire 121 as unidirectional current and flow to the emitter 118 of the transistor 119 and thence to its base, 120, and thence by wire 134 and resistor 135, back to the center point of the secondary 129.

This current, is derived from the main load current going through the transistor and through the control winding 59, to the transformer 128, and may be referred to as feedback current.

Since the feedback current as described, flows in at the emitter of the transistor and out at its base it will keep it in conducting condition.

To keep this derived rectified current from being in half waves coming to zero value, between waves at which it might render the transistor non-conducting, the winding 122 of and inductor is provided in the line 121 through which the derived current in the wire 121 flows on its way to the transistor.

The main load through the transistor and in the control winding 59 saturates the cores 55—56.

The aforesaid closing of push button contacts 52 and 53 closes the cross line 67; and alternating currents flows therein, through the circuitry between the wires 70 and 74.

When the half waves of the alternating current are from the main 29 to main 30, they flow from wire 70 through main winding 57 of amplifier unit A and thence by wire 77 to the winding 20 of the aforesaid electromagnetically operated valve (see Fig. 1); and thence to and through the upper half 79 of a control winding 66 on the cores 61—62 and thence by wire 80 to wire 82, through a rectifier 83 to a wire 84 to the wire 74.

The other half waves from main 30 to main 29 in wire 74, go through rectifier 85 and over the same circuit, to the wire 80, and then through main winding 58, and rectifier 86 to wire 70.

The cores 55—56 being saturated by control winding 59, the output of unit A energizes the valve winding 20 with unidirectional current from the A.-C. mains, and the press starts its cycle.

Thus the press starts when the operator operates both push button switches of the pair, 40—47, by his two hands. If there were several operators attending the press, a pair of push buttons for each of them would be provided having contacts in simple series with the contacts of the pair illustrated in the drawing, and all of the pairs would have to be operated to start the press, thus occupying both hands of all of the operators and keeping them at a safe distance from the press.

If the operator were to release either of his push button switches so that it would open its lower contacts 52 or 53, the above described circuit for the unit A to energize the valve winding 20 would be broken, the valve would restore and stop the press (as in Fig. 1).

After the press has gone approximately one half of its cycle, say 170°, it is no longer dangerous for the operator to have his hands free. At this time therefore the winding 20 is kept energized to keep the press going by the output of the amplifier unit B, independently of the push button switches, as follows.

The cross line 67—67 has wires 94 and 97 connected to the switch elements 69 and 72. And between the wires 94—97 are two switches 23 and 24, and a transformer primary 95, the switches being open and operable to be closed by cams 27 and 28 on the press shaft (see Fig. 1) at say 170° of a shaft revolution, or cylce; and when they close, the primary 95 is energized by alternating current across the mains 29—30 and it energizes a secondary 98.

It is to be noted that the upper half 79 of winding 66 is energized by the output of amplifier unit A before switches 23—24 first close. This current flowing through half 79 is sufficient to saturate the cores 61 and 62 so that when amplifier unit B is connected to a source of current, it will immediately have an output.

Current waves in the secondary 98 toward the left go from its left end through a rectifier 100; to main winding 63; to wires 101 and 77 through the valve winding 20, and thence through both the upper and lower halves 79 and 102 of control winding 66 to wire 103, through rectifier 104, and wire 105 to the right end of secondary 98.

Current waves in the secondary going toward its right end go from that end by wire 105 through rectifier 106 to wires 101 and 77 and so on as before to wire 103, and thence through main winding 64 and rectifier 107 to the left end of secondary 98.

The valve winding 20 is thus energized with unidirectional current.

When the switches 23—24 first close at say 170°, the push buttons switches 40—47 are still being held down and the valve winding 20 is energized as just described by output of unit B. The winding 20 is also still being energized by output of unit A as described.

Also both halves 79 and 102 of control winding 66 of unit B are energized by the output of unit B, and the upper half 79 is also still being energized by output of unit A.

When the push button switches are released, which may be at say 170° of the cycle, and open their contacts 52—53, the unit A is thereby cut off from its alternating current supply at these contacts and its output ceases.

Also release or restoring of the push button switches closes contacts 38 and 35, thereby energizing primary 41 of transformer C, giving an impulse to the transistor in the direction to render it non-conducting in spite of the feedback current maintaining it conducting and the control winding 59 of unit A becomes de-energized.

This leaves the valve winding 20 held energized by output of unit B alone, the control winding 66 being then energized by both its upper and lower halves 79 and 102.

When the press has completed its 360° cycle the switches 23 and 24 are opened by their cams, and the unit B is thereby cut off from its alternating current input, and energization of the valve winding 20 by its output ceases, and the press comes to rest.

If the push button switches 40 and 47 had not been released as described but were held down inadvertently to the end of the cycle, the secondary 35 of transformer 34 would still be supplying current through the transistor 119 to the control winding 59, and the main windings 57 and 58 would still be supplying output current to the valve winding 20, so that even if switches 23 and 24 opened, the press would not stop but would unexpectedly start another cycle, which would create hazard to the operator and to the work.

Provision is therefore made to insure that the press, under such circumstance will stop at the end of the cycle, as follows.

The switches 21 and 22 have their operating cams 25 and 26 on the crankshaft (see Fig. 1) formed and set to open and immediately close again at a point in the cycle near its end, and before switches 23 and 24 open.

This momentarily de-energizes the transformer 34 and stops flow of load current in wire 121 to the control winding 59 of unit A, so that the cores 55—56, not being saturated thereby, unit A has no output to energize valve winding 20 and it continues to be energized by unit B alone.

Cutting off the load current also cuts off the feedback current derived from it at the transformer 128, which was keeping the transistor in conducting condition, and it accordingly goes to non-conducting condition.

When the switches 21—22 again close which is before switches 23—24 open, flow of load current in wire 121, will not begin again because the transistor is non-conducting and without load current there will be no feedback current to render it conducting.

Control winding 59 of unit A therefore is not energized, and output from unit A to the valve winding 20 is not resumed.

The valve winding 20 is now energized by unit B alone, but when switches 23—24 open at the end of the cycle, it is thereby de-energized and the press stops.

As a matter of "non-repeat" safety, it is made necessary that the pair of push button switches 40—47 and other pairs if utilized, be fully released before a cycle of the press can start, as follows.

It requires a positive pulse of current from the secondary 115 of saturable transformer C, to the transistor 119, to render it conducting. The primary 41 of the transformer C must first be energized, and then de-energized to give this pulse; and it is arranged to be energized only when all push buttons are restored.

The action of the transformer C is further explained in connection with Fig. 4, as follows.

Figure 4:
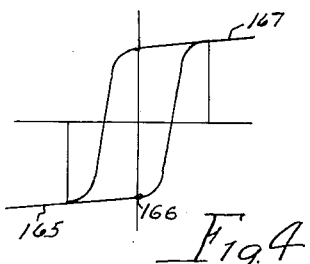
Fig. 4 is a view showing the hysteresis curve of a saturable transformer of Fig. 2.

At the end of a cycle, when the press or other machine has stopped, and the push button switches 40—47 and others if any, are all released, the primaries 41 and 109 are both energized, oppositely; 41 overpowering 109, and in Fig. 4 the flux in the core 42 will go to saturation say to the line 165. Any generation of an impulse in the circuit of secondary 115 by this building up of flux to saturation, and the energization of the transistor 119 by it, is of no effect on the transistor because the change of flux in Fig. 4 is in a direction that may be called negative, and the pulse to the transistor is in the wrong direction to render it conductive.

When the push button switches are operated they open the circuit of primary 41. The flux in the core, Fig. 4, due to the primary 41, decays from 165 to the point 166. The primary 109 is always energized and now acting alone, reverses the flux and carries it to saturation as at 167.

The rapid change of flux from 166 to 167 generates a secondary impulse in the reversed or positive direction which renders the transistor conducting.

When primary 41 is again energized it carries the value of flux from saturation at 167 to saturation at 165, without effect as before, except to render the transistor non-conducting again.

The control winding 66 of the unit B is illustrated and described as in upper and lower parts, 79 and 102. The upper part 79 is energized by the output of unit A in series with the valve winding 20, when the unit A is acting alone. When unit B also comes on upon closure of switches 23 and 24, both halves 79 and 102 of the winding are energized in series with the valve winding 20; and later unit A goes off, leaving unit B on alone to hold the winding 20 energized, through both winding halves.

The winding 79—102 would not make the output of unit B great enough to initiate operation of the valve by its winding 20, so that if the unit B by some accident of grounds or the like should come on prematurely even before unit A, the valve would not be prematurely operated.

However, after the valve is once operated by unit A, and unit B comes on with both halves 79—102 energized, they will give an output to unit B great enough to hold the valve operated by its winding 20.

*Inching*

To operate the invention with inching characteristics, the selector switch of Fig. 3 is set to the "inching" position, which happens to be that illustrated in Fig. 3. This closes switch contacts 49, 50, 87, and 89 of Fig. 2, and opens or leaves open all of the other selector switch contacts.

The system of Fig. 2 responds upon operation of the push button switches 39 and 48, to start and run, and upon restoring of them, to stop, so that the operator can operate the press for any desired fraction of a cycle in any part of the cycle.

Operating, or depressing, the push buttons 39 and 48 opens their normally closed contacts 37 and 46. This de-energizes primary 41 of transformer C, and it gives a secondary impulse to the transistor 119 that renders it conducting, and current flows, as described for "Running" characteristics, energizing control winding 59 of amplifier unit A.

Operating the push button switches 39 and 48 also closes contacts 51 and 54 through which A.C. current flows from main 29 by wire 88 to wire 70 and through the unit A to wire 74 and by wire 90 to main 30.

Unit A therefore has output at wires 77 and 80 energizing valve winding 20 as described for "running" characteristics; and the press starts.

The contacts 68 and 71 being open on the selector switch thus keeping wires 94 and 97 de-energized, the unit B never receives A.C. power and therefore never has output.

The press will continue to run so long as the operator keeps the push button switches operated; and will stop instantly when he releases and restores any one of them, because of opening contacts 51—54 and thereby cutting off power input to the unit A.

*Continuous operation*

The characteristics of "continuous" operation are that the press, when once started, continues to run indefinitely until stopped by cutting off the current to the valve winding.

The selector switch, Fig. 3, is moved to the "continuous" position, thereby closing selector contacts 92, 93, 98 and 99 of Fig. 2 and opening or leaving open all of the others.

To prevent unauthorized personnel from operating the press continuously, because of danger to the operating personnel, it is required to make a physical change in the circuits before continuous operation can be had. To this end the switch elements 69 and 72 of Fig. 2 must be shifted to their dotted line positions 69A and 72A.

To start the press the operator operates push button switches 40 and 47. Their upper contacts upon opening, cause current to flow through the transistor 119, and control winding 59 of unit A, as described for "Running." Their lower contacts 52—53 upon closing supply power to the unit A and its output goes to the valve winding 20 and this starts the press all as described for "Running"; and its output also energizes control windings 66 of unit B.

The cam operated switches 23—24 are shorted out by the selector contacts 98 and 99 so that power is always supplied to unit B by wires 94 and 97 and it always has an output energizing the valve winding 20.

The push buttons may now be restored, breaking the power input to the unit A at their contacts 52 and 53, and closing their contacts 38 and 45, which interrupts the current through the transistor 119 and in the control winding 59, so that unit A becomes de-energized.

Unit B continues to energize the valve winding 20 and the press continues to run.

To stop the press, power to the system and therefore current to the valve winding 20 must be cut off, and this is done conveniently by opening the switch 31 at the top of Fig. 2.

In Fig. 2 at the amplifier unit A, a resistor 175 is connected across the terminals of the control winding 59 for the following purpose.

When unidirectional current is flowing in the control winding 59 through the tranistor 119, and half waves of rectified A.C. are flowing in the main windings 57 and 58, the latter by transformer action, might induce periodic potential in the winding 59, great enough to interrupt the flow in the winding 59 and in the transistor 119, and interrupt the feed-back current that is keeping the transistor conductive; and the transistor would become non-conductive and output from unit A as described would cease.

The resistor 175 provides a local path for the said potential induced in the winding 59, whereby it is confined to the winding and does not act upon the transistor nor affect the normal operation.

Transistors as utilized herein, tend to conduct leakage current therethrough of negligible small magnitude when the transistor is cold; but the transistor becomes hot in use, and the leakage increases with its temperature.

Leakage current in the transistor 119 and energization of the control winding 59 thereby might in some cases become great enough to cause the Unit A to have output to the valve winding 20 sufficient to start the press unexpectedly, and with consequent danger to the operators, and damage to the machine or work therein.

This abnormality is corrected by subjecting the base 120 of the transistor to positive potential slightly higher than the potential of its emitter 118, when the transistor is non-conducting; accomplished, in Fig. 2, as follows.

The secondary 35 of transformer 34 has its left end connected through a rectifier 176 and a wire 177 to a wire 178; and has its right end connected through wires 114 and 179 and a rectifier 180 to the wire 178; and the wire 178 is connected to the aforesaid wire 116A which goes to the transistor base 120; the transistor emitter 118 being connected to the center point of the transformer secondary 35 by wire 121 as described.

A resistor 181 of relatively high ohmic value is provided in the line of the wire 178.

When the transistor 119 is non-conducting, the rectifiers 176 and 180 cause unidirectional positive potential to be impressed on the base 120 higher than the potential on the emitter 118, which prevents the transistor from conducting leakage current due to rise of its temperature.

The positive potential thus impressed on the base 120 can be small to perform in this manner when the transistor is non-conducting, and is controlled by the high resistance of resistor 181; and therefore will not affect normal operation of the transistor when rendered conducting.

In some instances of installation a "ground" of a part of the apparatus of Fig. 2 may be present, or develop. The apparatus is, evidently, in two right and left substantially duplicate halves; and it is sometimes difficult to determine in which half the ground exists, in order to find and correct it. Provision is made to overcome this difficulty.

At the top of Fig. 2, a right lamp 168 and a left lamp 169 are connected across the mains 29 and 30.

A wire 171 goes from the left main 29, to the right lamp 168; and thence a wire 172 goes to the left lamp 169, and thence a wire 173 to the right main 30. The wire 172 between the lamps is grounded as at 174.

The lamps being in series across the mains, will normally glow dully.

If there is a ground in the left half of the apparatus, current will flow from the left main 29 to the apparatus ground thence to the ground 174, and on its way to the main 30 will flow by wire 172 through the left lamp 169 and by wire 173 to the right main 30; and this will illuminate the left lamp 169 brightly, and thereby indicate that the apparatus ground is in the left half of the apparatus.

Similarly, the right lamp 168 will glow brightly if the apparatus ground is in the right half.

We claim:

1. In a control system, an A.C. current source; a work circuit containing an electric work device; a magnetic amplifier having an A.C. input circuit from the source, and having an output circuit connected to the device to energize it; and having a D.C. control winding; operator's switch means, having normally closed and normally open contacts; a normally non-conducting transistor; an electric transistor system energized by rectified current from the source and responsive, upon opening the normally closed contacts by operation of the operator's switch means to energize the transistor and render it conducting, and responsive to subsequent closing of the said contacts upon restoring of the operator's switch means, to reversely energize the transistor and render it non-conducting; a control winding circuit including the control winding and the transistor, energized by rectified current from the source, through the transistor, when it is conducting; the normally open contacts of the operator's switch means when closed by the operator connecting the amplifier input circuit to the source whereby when the operator's switch means is operated, the transistor is rendered conducting and the amplifier supplies controlled output to the device, and when the operator's switch means is restored the transistor is rendered non-conducting and the said output from the amplifier to the device is interrupted.

2. The system described in claim 1 and in which, the transistor is rendered conducting by a current impulse supplied thereto by the electric transistor system; and a maintaining circuit is provided deriving current from the control winding circuit and energizing the transistor to maintain it conducting after the impulse terminates so long as the operator's switch means is held operated; and in which the reverse energization of the transistor to render it non-conducting upon restoring of the operator's switch means overcomes the maintaining energization of the transistor.

3. A control system as described in claim 1 and in which a second magnetic amplifier is provided having a second input circuit, and having a D.C. output circuit connected to energize the device, and having a second control winding circuit connected to be energized by the same D.C. current energizing the device; and a normally open timed switch is provided timed to close and connect the second input circuit to the source before said restoring of the operator's switch means; whereby the device will be energized by the second amplifier output alone after the first amplifier output is interrupted by restoring of the operator's switch means.

4. A system as described in claim 3 and in which the timed switch is timed to finally open again after energization of the device by the second amplifier for a predetermined interval, to de-energize the device.

5. A control system as described in claim 4 and in which the control circuit through the transistor and control winding and maintaining circuit is energized from the source through the contacts of a normally closed second timed switch, timed to open and then close its contacts before final opening of the first named timed switch; whereby in the event that the operator's switch means is not restored when the first named timed switch finally opens to de-energize the device, output from the first amplifier that might otherwise keep the device energized will be terminated by the non-conducting condition of the transistor effected by interruption of its maintaining circuit by the second timed switch.

6. In a control system, a source of current, a magnetic amplifier having input from the source, a device to be energized connected to the amplifier output; the amplifier having a control winding; a transistor; circuit means and operable means controlling it to conduct rectified current from the source to the emitter of the transductor and out at its base to render it conducting at will; a control circuit energized by current from the source including the transistor and the control circuit to energize the control winding and cause the amplifier to have output and to energize the device thereby when the transistor is rendered conducting by the operable means; means to prevent leakage conduction through the transistor and corresponding unwanted energization of the device when the transistor has been rendered non-conducting by the operable means, comprising a circuit energized from the source and always impressing on the transistor base and emitter a potential in the direction to render it non-conducting and of low value, to prevent leakage conduction but not prevent rendering the transistor conducting by the operable means.

7. In a control system, an A.C. current source, a magnetic amplifier having an input circuit including a winding connected to the source, and having an output circuit, and having a D.C. control winding; a transistor; a control circuit in which the transistor is in series with the control winding; operable means to render the transistor conducting to cause the amplifier to respond to the control winding and cause A.C. to flow in the input circuit winding of the amplifier to energize the amplifier output circuit; means to prevent A.C. generated in the control winding by alternations of current in the input winding from rendering the transistor non-conducting, comprising a resistor connected across the control winding.

8. In a control system comprising apparatus parts in right and left portions of an assembly on a main frame, and which parts may become grounded on the frame, means to indicate whether a ground is in the right or left half of the assembly to facilitate its detection and repair, comprising a right and a left lamp spaced apart, and connected in series between right and left supply mains and a ground connection to a point between them, whereby a ground in the right or left half of the assembly will brightly illuminate the right or left lamp respectively.

9. The system described in claim 1 and in which the electric transistor system comprises a transformer having a saturable core, a first and a second primary, and a secondary; the second primary being always energized with unidirectional current and capable of saturating the core, with flux in one direction, the first primary being normally energized with unidirectional current through the normally closed contacts of the operator's switch means; and normally overpowering the second primary and saturating the core with flux in the other direction; whereby upon opening the normally closed contacts of the operator's switch means, the first primary is de-energized and the second primary predominates and reverses the direction of the saturating flux in the core and thereby generates a pulse of current in the secondary; and a circuit connects the secondary to the emitter and base of the transistor in which said pulse of current flows in the direction to render the transistor conducting.

10. In a control system for energizing a device at will, an A.C. current source; a magnetic amplifier energized from the source and having a control winding, and having an output circuit connected to the device; a transistor normally in non-conducting condition; an operator's switch means having normally closed contacts; a transistor electric system energized with unidirectional current rectified from the source and responsive to opening of the normally closed contacts to supply a pulse of current to the transistor to render it momentarily conducting; a first circuit means energized by unidirectional current rectified from the source and containing the transistor and control winding in series, whereby current flows in the control winding and causes the amplifier to deliver output to the device to energize it, and a second circuit means deriving current from the first circuit means and energizing the transistor with sustaining current to maintain it in conducting condition after termination of the impulse, to maintain energization of the device.

11. A control system as described in claim 10 and in which the transistor electric system responds to again closing the opened contacts of the operator's switch means, to supply a pulse of current to the transistor in the reverse direction to render it non-conducting, whereby the sustaining current is interrupted and the transistor becomes non-conducting, and the control winding ceases to be energized and output to the device is interrupted.

12. A control system as described in claim 3 and in which a second operator's switch means is provided having normally open contacts; and having normally closed contacts in series with the normally closed contacts of the said operator's switch means; and an operator's selector switch is provided, having contacts operable to open the input circuit of the second amplifier and to connect the input of the first amplifier to the supply mains through the normally open contacts of the second operator's switch means; whereby the device will be energized by the first amplifier unit alone, upon operating the second operator's switch means, and de-energized upon restoring the second operator's switch means, to effect, at the will of the operator, intermittent energization of the device for selected periods of time.

13. A control system as described in claim 3 and in which an operator's selector switch is provided having contacts operable to connect the input of the second amplifier directly to the supply mains, and to connect the input of the first amplifier to the supply mains through the normally open contacts of the operator's switch means; whereby upon operation of the operator's switch means, the output of the first amplifier energizes the device, and energizes the control winding of the second amplifier and upon restoring the operator's switch means, output of the first amplifier is terminated and the second amplifier alone energizes the device, continuously.

14. In a control system a device to be energized and de-energized at will a source of A.C., an operator's switch means having normally closed and normally open contacts; a magnetic amplifier having an input circuit connected to the source through the normally open contacts of the operator's switch means; the amplifier having an output circuit connected to the device, and having a control winding; a transistor, in series with the control winding in a control circuit energized by unidirectional current rectified from the source; a transistor electric system energized by unidirectional current rectified from the source and energizing the transistor through the normally closed contacts to render it non-conducting and to render it conducting when the operator's switch means is operated to open the normally closed contacts; whereby operating the operator's switch means causes the rectifier output to energize the device, and restoring the operator's switch means causes the device to be de-energized.

15. In a control system, an A.C. current source; a first magnetic amplifier comprising input mains, output mains, rectifiers and a control winding; a load to be energized connected to the output mains; whereby when the input mains are connected to the A.C. source, and the control winding is energized with unidirectional current, the output mains will energize the load with unidirectional current; an operator's switch means having normally closed and normally open contacts; a transistor connected in series with the control winding; a transistor electric system energized with unidirectional current rectified from the A.C. source and responsive to opening of the normally closed contacts upon operation of the operator's switch means, to render the transistor conducting and cause the control winding to be energized through the transistor, with unidirectional current; the operation of the operator's switch means closing its normally open contacts and connecting the amplifier input mains to the A.C. source; and subsequent restoring of the operator's switch means disconnecting the input mains from the A.C. source and thereby interrupting energization of the load by the first magnetic amplifier; a second magnetic amplifier comprising second input mains, second output mains, rectifiers and a second control winding; the said load and second control winding being connected to the second output mains; a timed switch timed to operate before restoring of the operator's switch means, and connecting the second input mains to the A.C. source, to cause the output mains of the second amplifier to energize the second control winding and the load with unidirectional current; whereby upon restoring of the operator's switch means, the load will continue to be energized solely by the second amplifier; the timed switch timed to restore after a timed interval following restoring of the operator's switch means, to de-energize the second amplifier and thereby de-energize the load.

References Cited in the file of this patent

UNITED STATES PATENTS

| | | |
|---|---|---|
| 2,809,343 | Pittman | Oct. 8, 1957 |
| 2,819,352 | Houck | Jan. 7, 1958 |